US012276455B2

(12) United States Patent
Gosho et al.

(10) Patent No.: US 12,276,455 B2
(45) Date of Patent: Apr. 15, 2025

(54) SUBSTRATE PROCESSING APPARATUS AND SUBSTRATE PROCESSING METHOD

(71) Applicant: TOKYO ELECTRON LIMITED, Tokyo (JP)

(72) Inventors: Masataka Gosho, Kumamoto (JP); Shu Yamamoto, Kumamoto (JP); Tomohito Ura, Kumamoto (JP); Satoshi Okamura, Kumamoto (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 702 days.

(21) Appl. No.: 17/464,367

(22) Filed: Sep. 1, 2021

(65) Prior Publication Data

US 2022/0074660 A1 Mar. 10, 2022

(30) Foreign Application Priority Data

Sep. 4, 2020 (JP) .................................. 2020-149377

(51) Int. Cl.
*F26B 5/00* (2006.01)
*F26B 21/06* (2006.01)
*G01M 3/04* (2006.01)
(52) U.S. Cl.
CPC .............. *F26B 5/005* (2013.01); *F26B 21/06* (2013.01); *G01M 3/04* (2013.01)

(58) Field of Classification Search
CPC ........... F26B 5/005; F26B 21/06; G01M 3/04; G01M 3/226; H01L 21/67034; H01L 21/02101; H01L 21/02057; H01L 21/67253; H01L 22/26
See application file for complete search history.

(56) References Cited

U.S. PATENT DOCUMENTS

2012/0152898 A1\* 6/2012 Cho .................. H01L 21/67023
156/345.24
2018/0096863 A1\* 4/2018 Goshi ............... H01L 21/02057

FOREIGN PATENT DOCUMENTS

JP 2007152195 A 6/2007
KR 10-2019-0126140 A 11/2019
WO 2018/173861 A1 9/2018

\* cited by examiner

*Primary Examiner* — Jessica Yuen
(74) *Attorney, Agent, or Firm* — Nath, Goldberg & Meyer; Jerald L. Meyer; Tanya E. Harkins

(57) ABSTRACT

A substrate processing apparatus for drying a substrate by substituting a liquid film of a drying liquid formed on the substrate with a supercritical fluid incudes: a pressure container configured to accommodate the substrate on which the liquid film is formed; a discharge line configured to discharge a fluid inside the pressure container; a depressurizing valve provided in a middle of the discharge line; and a concentration measurement part configured to measure a concentration of vapor of the drying liquid in the fluid flowing through the discharge line, wherein the concentration measurement part is provided on a downstream side of the depressurizing valve of the discharge line and measures the concentration of the drying liquid in the fluid depressurized by the depressurizing valve.

20 Claims, 8 Drawing Sheets

SUBSTRATE PROCESSING APPARATUS AND SUBSTRATE PROCESSING METHOD

CROSS-REFERENCE TO RELATED APPLICATION

This application is based upon and claims the benefit of priority from Japanese Patent Application No. 2020-149377, filed on Sep. 4, 2020, the entire contents of which are incorporated herein by reference.

TECHNICAL FIELD

The present disclosure relates to a substrate processing apparatus and a substrate processing method.

BACKGROUND

A substrate processing apparatus described in Patent Document 1 includes a drying part, a discharge line, an acquisition part, and a detection part. The drying part dries a substrate by bringing the substrate, the surface of which is wet with liquid, into contact with a supercritical fluid and replacing the liquid with the supercritical fluid. The discharge line is provided in the drying part so as to discharge the fluid from the drying part. The acquisition part is provided in the discharge line so as to acquire optical information for the fluid discharged from the drying part. The acquisition part is provided upstream of a back pressure valve. The detection part detects the presence or absence of liquid in the drying part based on the optical information acquired by the acquisition part.

PRIOR ART DOCUMENT

Patent Document

Patent Document 1: International Publication No. WO 2018/173861

SUMMARY

A substrate processing apparatus according to an aspect of the present disclosure dries a substrate by substituting a liquid film of a drying liquid formed on the substrate with a supercritical fluid. The substrate processing apparatus incudes a pressure container, a discharge line, a depressurizing valve, and a concentration measurement part. The pressure container accommodates the substrate on which the liquid film is formed. The discharge line discharges a fluid inside the pressure container. The depressurizing valve is provided in a middle of the discharge line. The concentration measurement part measures a concentration of the drying liquid in the fluid flowing through the discharge line. The concentration measurement part is provided on a downstream side of the depressurizing valve of the discharge line, and measures the concentration of the drying liquid in the fluid depressurized by the depressurizing valve

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Figure 1:
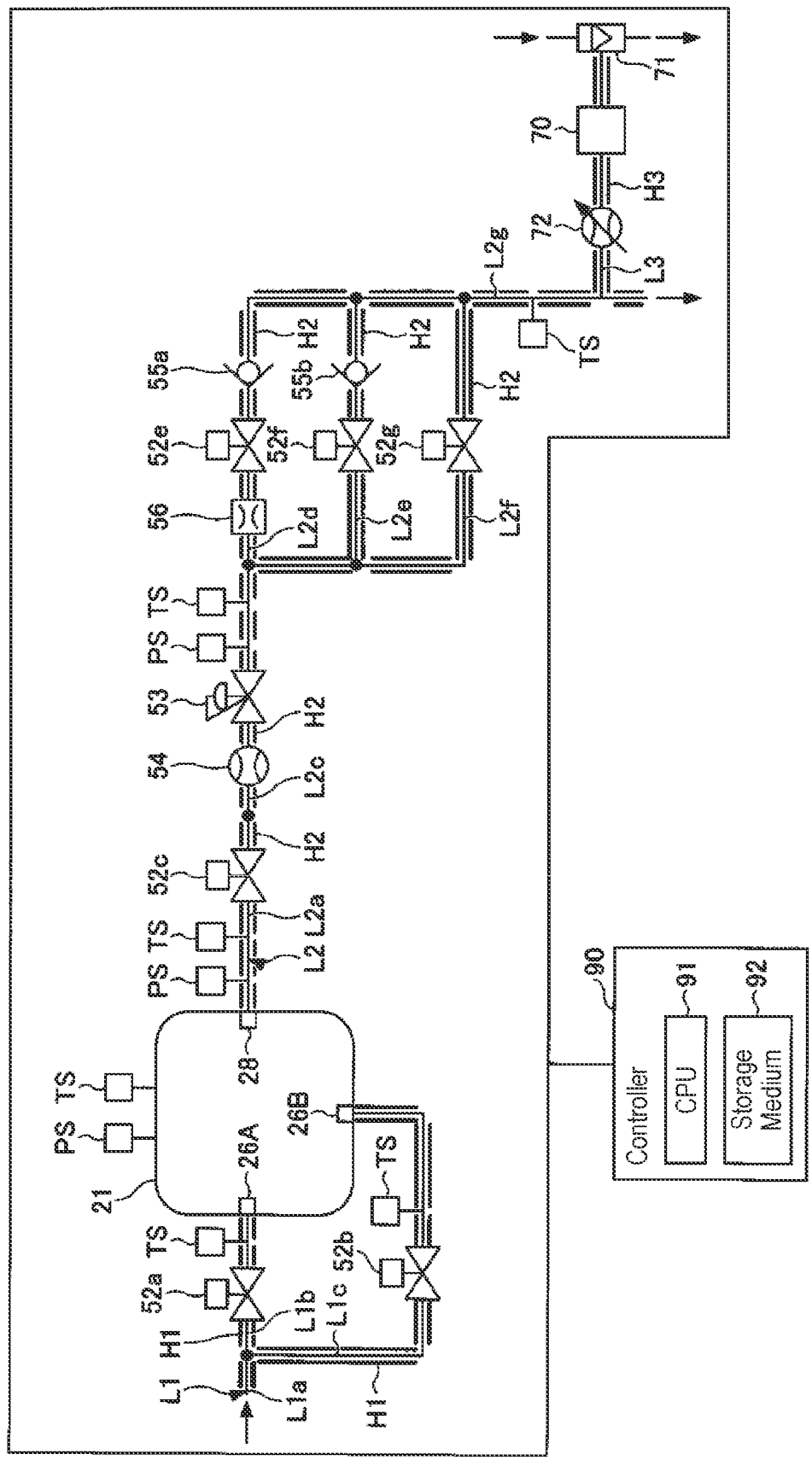
FIG. 1 is a view illustrating a substrate processing apparatus according to an embodiment.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, embodiments of the present disclosure will be described with reference to the drawings. In each drawing, the same or corresponding components may be denoted by the same reference numerals, and a description thereof may be omitted. Herein, the term "upstream" means an upstream in a flow direction of a supercritical fluid, and the term "downstream" means a downstream in the flow direction of the supercritical fluid.

First, a substrate processing apparatus 1 of the present embodiment will be described with reference to FIGS. 1 and 2. The substrate processing apparatus 1 dries a substrate W by replacing a liquid film of a drying liquid formed on the substrate W with a supercritical fluid. The supercritical fluid is a fluid that is placed under a temperature equal to or higher than a critical temperature and a pressure equal to or higher than a critical pressure, and is a fluid in a state in which a liquid and a gas are not distinguished from each other. By replacing the liquid film of the drying liquid or the like with the supercritical fluid, it is possible to suppress appearance of an interface between the liquid and the gas in a concave-convex pattern in the substrate W. As a result, it is possible to suppress generation of surface tension, and thus it is possible to suppress collapse of the concave-convex pattern. The drying liquid is, for example, an organic solvent such as isopropyl alcohol (IPA), and the supercritical fluid is, for example, $CO_2$.

Figure 2:
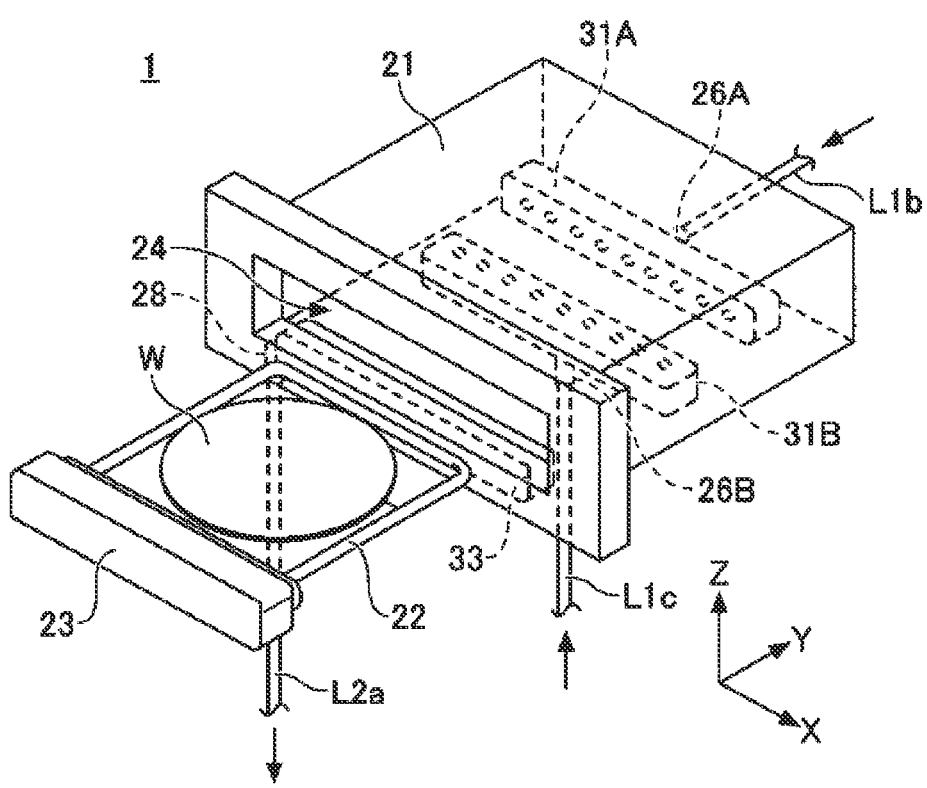
FIG. 2 is a perspective view illustrating a pressure container of FIG. 1.

As illustrated in FIG. 2, the substrate processing apparatus 1 includes a pressure container 21, a holder 22, and a lid 23. The pressure container 21 accommodates therein a substrate W on which a liquid film of a drying liquid is formed. The pressure container 21 is provided with an opening 24 to load or unload the substrate W therethrough. The holder 22 holds the substrate W horizontally with the liquid film facing upward inside the pressure container 21. The lid 23 closes the opening 24 in the pressure container 21. The lid 23 and the holder 22 are connected to each other, so the holder 22 moves together with the lid 23.

The pressure container 21 defines a space therein. Supply ports 26A and 26B and a discharge port 28 are provided in a wall of the pressure container 21. The supply ports 26A and 26B are connected to a supply line L1 illustrated in FIG. 1. The supply line L1 supplies the supercritical fluid to the pressure container 21. The discharge port 28 is connected to a discharge line L2 illustrated in FIG. 1.

The supply port 26A is connected to a side surface of the pressure container 21 on a side opposite to the opening 24. The supply port 26B is connected to a bottom surface of the pressure container 21. In addition, the discharge port 28 is connected to a lower side of the opening 24. Although two supply ports 26A and 26B and one discharge port 28 are illustrated in FIGS. 1 and 2, the number of supply ports 26A and 26B and the number of discharge ports 28 are not particularly limited.

Inside the pressure container 21, supply headers 31A and 31B and a discharge header 33 are provided. Each of the supply headers 31A and 31B and the discharge header 33 is formed with a plurality of openings therein.

The supply header 31A is connected to the supply port 26A and is provided inside the pressure container 21 adjacent to the side surface opposite to the opening 24. The plurality of openings formed in the supply header 31A faces toward the opening 24.

The supply header 31B is connected to the supply port 26B and is provided in a center of the bottom surface inside the pressure container 21. The plurality of openings formed in the supply header 31B faces upward.

The discharge header 33 is connected to the discharge port 28, and is provided inside the pressure container 21 below the opening 24 and adjacent to the side surface on the side of the opening 24. Further, the plurality of openings formed in the discharge header 33 faces toward the supply header 31A.

The supply headers 31A and 31B supply the supercritical fluid into the pressure container 21. In addition, the discharge header 33 discharges a fluid inside the pressure container 21 to the outside. The fluid discharged to the outside by the discharge header 33 includes the supercritical fluid, and further contains vapor of the drying liquid dissolved in the supercritical fluid.

As illustrated in FIG. 1, the substrate processing apparatus 1 includes the supply line L1. The supply line L1 connects a fluid source and the pressure container 21 to each other. The supercritical fluid is supplied to the supply line L1 from the fluid source. A heater H1 is provided on the supply line L1. The heater H1 maintains the supercritical fluid supplied to the pressure container 21 at a critical temperature or higher. The heater H1 is provided, for example, over the entire supply line L1.

The supply line L1 has a common line L1a, a distribution line L1b, and a boost line L1c. An upstream end of the common line L1a is connected to the fluid source, and a downstream end of the common line is connected to the distribution line L1b and the boost line L1c. The distribution line L1b is connected to the supply port 26A, and the boost line L1c is connected to the supply port 26B.

The distribution line L1b is provided with an opening/closing valve 52a and a temperature sensor TS. The opening/closing valve 52a opens and closes a fluid flow path. When the opening/closing valve 52a opens the flow path, the supercritical fluid is supplied into the pressure container 21 via the supply port 26A and the supply header 31A (see FIG. 2). On the other hand, when the opening/closing valve 52a closes the flow path, the supply of the supercritical fluid to the pressure container 21 is stopped.

Similarly, the boost line L1c is provided with an opening/closing valve 52b and a temperature sensor TS. The opening/closing valve 52b opens and closes a fluid flow path. When the opening/closing valve 52b opens the flow path, the supercritical fluid is supplied into the pressure container 21 via the supply port 26B and the supply header 31B (see FIG. 2). On the other hand, when the opening/closing valve 52b closes the flow path, the supply of the supercritical fluid to the pressure container 21 is stopped.

Although the distribution line L1b and the boost line L1c are separately provided in the present embodiment, they may be formed integral with each other.

The substrate processing apparatus 1 has the discharge line L2. The discharge line L2 discharges a fluid inside the pressure container 21. A heater H2 is provided on the discharge line L2. The heater H2 suppresses liquefaction of the fluid in the discharge line L2. The heater H2 is provided, for example, over the entire discharge line L2.

The discharge line L2 includes, for example, an opening/closing line L2a, a first common line L2c, a first intermediate line L2d, a second intermediate line L2e, a third intermediate line L2f, and a second common line L2g.

The opening/closing line L2a extends from the discharge port 28 of the pressure container 21 to an upstream end of the first common line L2c. The opening/closing line L2a is provided with an opening/closing valve 52c, a temperature sensor TS, and a pressure sensor PS. The opening/closing valve 52c opens and closes a fluid flow path. When the opening/closing valve 52c opens the flow path, the fluid inside the pressure container 21 is discharged to the outside of the substrate processing apparatus 1 via the discharge header 33 (see FIG. 2) and the discharge port 28. On the other hand, when the opening/closing valve 52c closes the flow path, the discharge of the fluid from the pressure container 21 is stopped.

The first common line L2c is provided with a depressurizing valve 53, a flow meter 54, a temperature sensor TS, and a pressure sensor PS. The depressurizing valve 53 reduces a pressure of a fluid on a downstream side of the depressurizing valve 53 compared to a pressure of a fluid on an upstream side of the depressurizing valve 53. The pressure on the upstream side of the depressurizing valve 53 is, for example, 14 MPa to 18 MPa, and the pressure on the downstream side of the depressurizing valve 53 is, for example, 0.1 MPa to 0.5 MPa. The flow meter 54 measures a flow rate of the fluid before being depressurized, but a flow rate of the fluid after being depressurized may be measured.

Each of the first intermediate line L2d, the second intermediate line L2e, and the third intermediate line L2f extends from a downstream end of the first common line L2c to an upstream end of the second common line L2g.

The first intermediate line L2d is provided with an opening/closing valve 52e, a check valve 55a, and an orifice 56. The opening/closing valve 52e opens and closes a fluid flow path. When the opening/closing valve 52e opens the flow path, the fluid inside the pressure container 21 passes through the opening/closing valve 52e and is discharged to the outside of the substrate processing apparatus 1. On the other hand, when the opening/closing valve 52e closes the flow path, the discharge of the fluid via the first intermediate line L2d is stopped. The check valve 55a prevents backflow of the fluid.

Similarly, the second intermediate line L2e is provided with an opening/closing valve 52f and a check valve 55b. The opening/closing valve 52f opens and closes a fluid flow path. When the opening/closing valve 52f opens the flow path, the fluid inside the pressure container 21 passes through the opening/closing valve 52f and is discharged to the outside of the substrate processing apparatus 1. On the other hand, when the opening/closing valve 52f closes the flow path, the discharge of the fluid via the second intermediate line L2e is stopped. The check valve 55b prevents backflow of the fluid.

An opening/closing valve 52g is provided in the third intermediate line L2f. The opening/closing valve 52g opens and closes a fluid flow path. When the opening/closing valve 52g opens the flow path, the fluid inside the pressure container 21 passes through the opening/closing valve 52g and is discharged to the outside of the substrate processing apparatus 1. On the other hand, when the opening/closing valve 52g closes the flow path, the discharge of the fluid via the third intermediate line L2f is stopped.

Although the first intermediate line L2d, the second intermediate line L2e, and the third intermediate line L2f are separately provided in the present embodiment, they may be formed integral with one another. However, in the former case, it is possible to finely control a discharge flow rate of the fluid by discharging the fluid by the plurality of opening/closing valves 52e, 52f, and 52g.

The substrate processing apparatus 1 includes a controller 90. The controller 90 is, for example, a computer, and includes a central processing unit (CPU) 91 and a non-transitory computer-readable storage medium 92 such as a memory. In the storage medium 92, a program for controlling various processes executed in the substrate processing apparatus 1 is stored. The controller 90 controls operation of the substrate processing apparatus 1 by causing the CPU 91 to execute the program stored in the storage medium 92.

Figure 3:
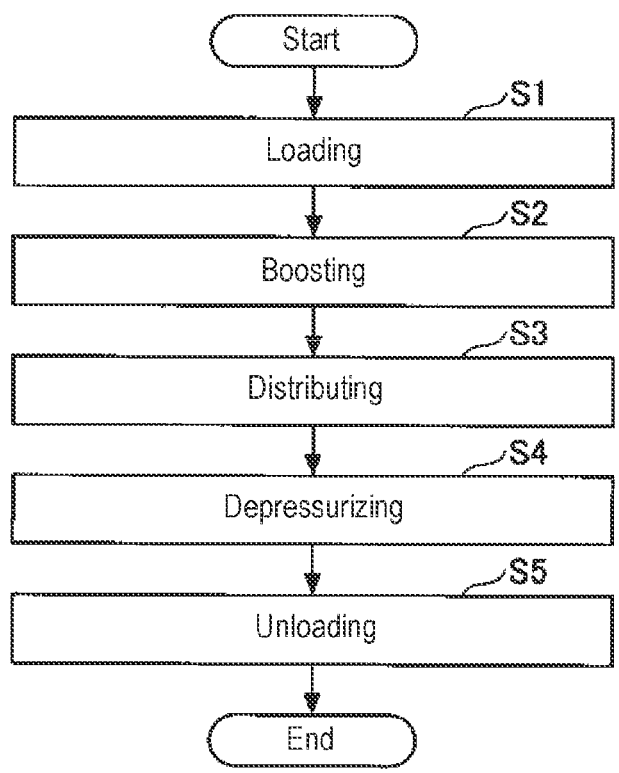
FIG. 3 is a flowchart illustrating a substrate processing method according to an embodiment.

Next, a substrate processing method of the present disclosure will be described with reference to FIG. 3. Steps S1 to S5 illustrated in FIG. 3 are performed under a control of the controller 90.

First, in step S1, a transfer device (not illustrated) loads a substrate W on which a liquid film of a drying liquid is formed into the substrate processing apparatus 1. The holder 22 receives the substrate W from the transfer device and holds the substrate W horizontally with the liquid film facing upward. The substrate W is accommodated inside the pressure container 21, and the lid 23 closes the opening 24 in the pressure container 21.

Subsequently, in step S2, the supply line L1 supplies the supercritical fluid into the pressure container 21 via the supply port 26B and the supply header 31B, thereby increasing an internal pressure of the pressure container 21. At that time, the supercritical fluid is supplied from below the substrate W so as to prevent the liquid film formed on the substrate W from being disturbed. The internal pressure of the pressure container 21 may increase to a set pressure equal to or higher than a critical pressure. During this time, the discharge line L2 does not discharge the fluid inside the pressure container 21.

Subsequently, in step S3, the supply line L1 supplies the supercritical fluid into the pressure container 21 via the supply port 26A and the supply header 31A, and the discharge line L2 discharges the fluid inside the pressure container 21. Thus, the supercritical fluid is distributed above the substrate W. The drying liquid dissolved in the supercritical fluid is discharged to the outside of the pressure container 21, the liquid film of the drying liquid is substituted with the supercritical fluid, and the substrate W is dried. At that time, the supply flow rate and the discharge flow rate are equal to each other, and the internal pressure of the pressure container 21 is maintained at the set pressure.

Subsequently, in step S4, the supply line L1 stops supplying the supercritical fluid into the pressure container 21, and the discharge line L2 discharges the fluid inside the pressure container 21. Thus, the inside of the pressure container 21 is depressurized. The internal pressure of the pressure container 21 is reduced to about atmospheric pressure (0.1 MPa). Thereafter, the lid 23 opens the opening 24 of the pressure container 21, and the substrate W is taken out of the pressure container 21.

Finally, in step S5, the transfer device (not illustrated) receives the substrate W from the holder 22 and unloads the received substrate W to the outside of the substrate processing apparatus 1.

Next, referring back to FIG. 1, a concentration measurement part 70 of the substrate processing apparatus 1 will be described. The concentration measurement part 70 measures a concentration of the drying liquid in the fluid flowing through the discharge line L2. The concentration measurement part 70 measures the concentration of the drying liquid in the fluid by measuring absorbance by, for example, a spectrophotometer.

The concentration measurement part 70 is provided on a downstream side of the depressurizing valve 53 of the discharge line L2, and measures the concentration of the drying liquid in the fluid depressurized by the depressurizing valve 53. The fluid depressurized by the depressurizing valve 53 is not a supercritical fluid, but a gas. The concentration measurement part 70 measures the concentration of the drying liquid in the gas. The drying liquid is in a vapor state.

On a downstream side of the depressurizing valve 53 of the discharge line L2, the fluid pressure is sufficiently low. Thus, the concentration measurement part 70 does not require any pressure resistance. Therefore, it is possible to simplify the structure of the concentration measurement part 70. In addition, inspection such as pressure resistance certification of the concentration measurement part 70 is unnecessary.

The concentration measurement part 70 is provided, for example, in the middle of a concentration measurement line L3. The concentration measurement line L3 branches off from the discharge line L2 on a downstream side of the depressurizing valve 53 of the discharge line L2. For example, the concentration measurement line L3 branches from the middle of the second common line L2g of the discharge line L2.

An exhaust source 71, such as an ejector, is provided at a downstream end of the concentration measurement line L3. In addition, a flow meter 72 and a heater H3 are provided in the middle of the concentration measurement line L3. The flow meter 72 measures a flow rate of the gas passing through the concentration measurement line L3. In addition, the heater H3 suppresses liquefaction of gas in the concentration measurement line L3.

The heater H3 suppresses the liquefaction of the vapor of the drying liquid in the concentration measurement line L3, thereby suppressing droplets of the drying liquid from adhering to a wall surface of the flow path. The vapor of the drying liquid moves quickly without adhering to the wall surface of the flow path and reaches the concentration measurement part 70. Therefore, it is possible for the concentration measurement part 70 to quickly detect a change in concentration of the drying liquid in the discharge port 28 of the pressure container 21. The heater H3 is provided, for example, over the entire concentration measurement line L3.

Figure 4:
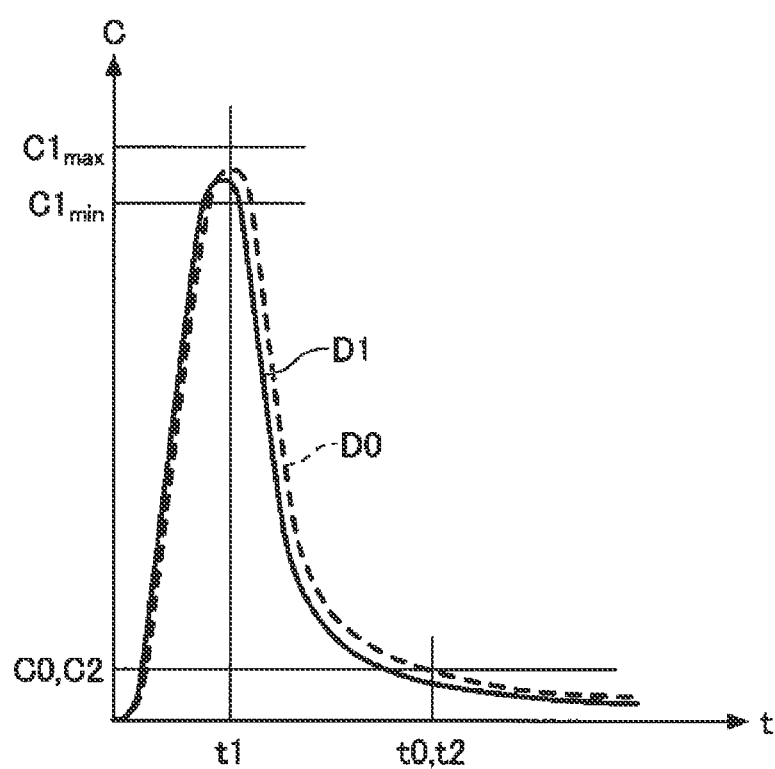
FIG. 4 is a view illustrating temporal change data and reference data of a concentration measured by a concentration measurement part.

The concentration measurement part 70 measures the concentration of the drying liquid in the fluid flowing through the discharge line L2 every unit time. As a result, temporal change data D1 illustrated by the solid line in FIG. 4 is obtained. A horizontal axis t in FIG. 4 is an elapsed time from a start of discharging the fluid by the discharge line L2, that is, the elapsed time from the start of step S3. In addition, reference symbol C on a vertical axis of FIG. 4 is the concentration of the drying liquid measured by the concentration measurement part 70.

After the start of step S3, a fluid mixture of the supercritical fluid and the drying liquid dissolved in the supercritical fluid is discharged from the pressure container 21 to the discharge line L2. As a result, the concentration C of the drying liquid measured by the concentration measurement part 70 increases and reaches a peak concentration. Thereafter, as the substitution of the liquid film of the drying liquid with the supercritical fluid progresses on the top surface of the substrate W, the concentration C decreases.

Figure 5:
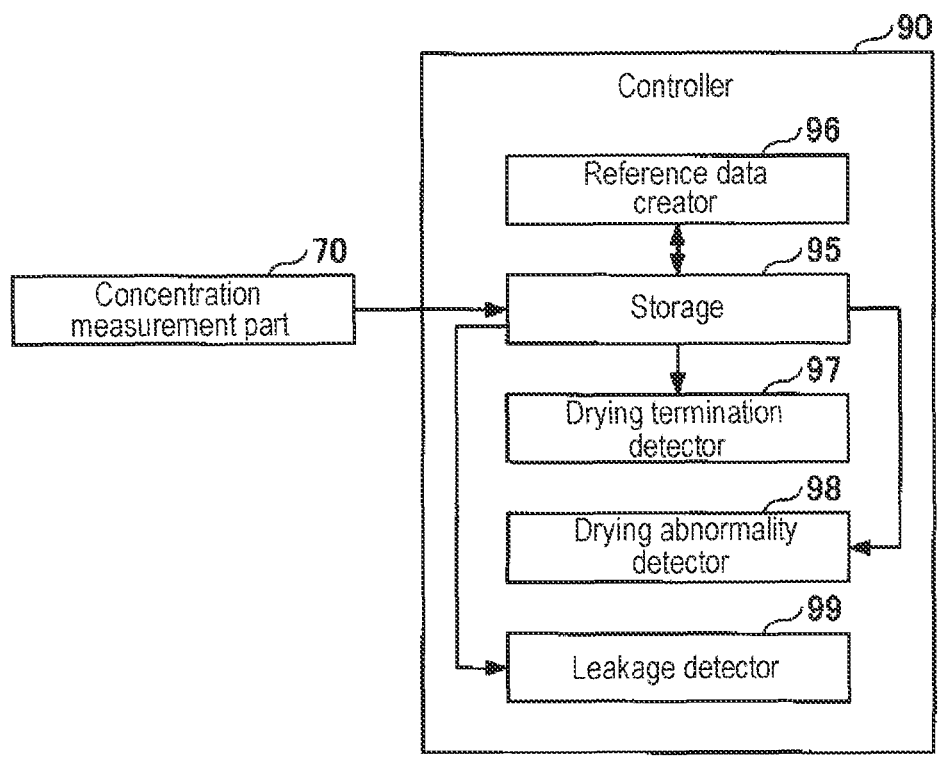
FIG. 5 is a diagram illustrating exemplary components of a controller in functional blocks.

Next, a function of the controller 90 will be described with reference to FIG. 5. Each functional block illustrated in FIG. 5 is conceptual and does not necessarily have to be physically configured as illustrated in the drawing. It is possible to configure all or part of the functional blocks to be functionally or physically distributed/integrated in any unit. All or any part in each processing function performed in each functional block may be implemented by a program executed by a CPU, or may be implemented as hardware by wired logic. The controller 90 includes, for example, a storage 95, a reference data creator 96, a drying termination detector 97, a drying abnormality detector 98, and a leakage detector 99.

The storage 95 stores the temporal change data D1 of the concentration C measured every unit time by the concentration measurement part 70. In addition, the storage 95 stores reference data D0 (see FIG. 4) of the temporal change data D1 in advance. The reference data D0 is data in which the elapsed time t and the concentration C are associated with each other, and is used for detecting termination of drying or an abnormality in drying.

The reference data creator 96 creates the reference data D0 by averaging, for example, multiple pieces of temporal change data measured in the past. A method of creating the reference data D0 is not particularly limited, but is as follows, for example.

First, in a state in which no substrate W is present in the pressure container 21, the supply line L1 supplies the supercritical fluid to the pressure container 21, and the discharge line L2 discharges the fluid inside the pressure container 21 to the outside of the substrate processing apparatus 1. As a result, the drying liquid remaining in the pressure container 21 or the discharge line L2 is dissolved in the supercritical fluid and discharged to the outside of the substrate processing apparatus 1 together with the supercritical fluid.

Subsequently, the process illustrated in FIG. 3 is repeated four or more times, and the storage 95 stores the second and subsequent temporal change data, except for the first temporal change data. The processing conditions at that time, such as an amount of the liquid film of the drying liquid formed in advance on the top surface of the substrate W, the internal pressure of the pressure container 21, and the discharge flow rate of the fluid from the pressure container 21, are set to be the same as those at the time of detecting termination of drying or an abnormality in drying. The reference data creator 96 creates the reference data D0 by averaging the second and subsequent temporal change data.

Reference data may be created in an apparatus, which is different from the substrate processing apparatus 1 but has the same structure as the substrate processing apparatus 1, and stored in the storage 95 as the reference data D0.

In the present embodiment, an average of the actually measured values is used as the reference data D0, but a theoretical value may be used as the reference data D0. The reference data creator % creates the reference data D0 based on, for example, the amount of the liquid film of the drying liquid previously formed on the top surface of the substrate W, a volume of the pressure container 21, the internal pressure of the pressure container 21, and the discharge flow rate of the fluid from the pressure container 21.

Physical quantities used to create the reference data D0 are, for example, as follows. In the calculation described below, the supercritical fluid is $CO_2$ and the drying liquid is IPA. In addition, combination of the supercritical fluid and the drying liquid is not particularly limited.

Volume of the pressure container 21: A [L]

Flow rate of $CO_2$ supplied to the pressure container 21 in step S3: B [kg/min]

Amount of IPA liquid film formed in advance on the top surface of the substrate W: C [mL]

Density of IPA in the pressure container 21 in step S3: D [g/mL]

Density of $CO_2$ in the pressure container 21 in step S3: E [g/L]

Density of $CO_2$ at atmospheric pressure: F [g/L]

Density of IPA density at atmospheric pressure: G [g/L]

In step S3, the internal pressure of the pressure container 21 is kept constant, and the flow rate of $CO_2$ supplied to the pressure container 21 is equal to the flow rate of the fluid discharged from the pressure container 21.

Values of physical quantities at the time of t=0 second (the start time of step S3) are as follows.

Mass of $CO_2$ inside the pressure container 21: A×E [g]

Mass of IPA inside the pressure container 21: $H_0$ ($H_0$=C×D) [g]

Concentration of IPA inside the pressure container 21: $J_0$ ($J_0$=$H_0$/($H_0$+A×E)) [wt %]

Mass of IPA in the fluid discharged from the pressure container 21 between t=0 second and t=1 second: $K_0$ ($K_0$=B/60×1000×$J_0$) [g]

Concentration of IPA in the fluid when the fluid discharged from the pressure container 21 between t=0 second and t=1 second is depressurized to atmospheric pressure: $L_0$ ($L_0$=$J_0$×F/G) [vol %]

Here, it is assumed that at t=0 second, all of the IPA is dissolved in $CO_2$ and is in a supercritical state.

Values of physical quantities at t=1 second are as follows.

Mass of IPA inside the pressure container 21: $H_1$ ($H_1$=$H_0$−$K_0$) [g]

Concentration of IPA inside the pressure container 21: $J_1$ ($J_1$=$H_1$/($H_1$+A×E)) [wt %]

Mass of IPA in the fluid discharged from the pressure container 21 between t=1 second and t=2 second: $K_1$ ($K_1$=B/60×1000×$J_1$) [g]

Concentration of IPA in the fluid when the fluid discharged from the pressure container 21 between t=1 second and t=2 second is depressurized to atmospheric pressure: $L_1$ ($L_1$=$J_1$×F/G) [vol %]

Values of physical quantities at t=n second are as follows.

Mass of IPA inside the pressure container 21: $H_n$ ($H_n$=$H_{n-1}$−$K_{n-1}$) [g]

Concentration of IPA inside the pressure container 21: $J_n$ ($J_n$=$H_n$/($H_n$+A×E)) [wt %]

Mass of IPA in the fluid discharged from the pressure container 21 between t=n second and t=n+1 second: $K_n$ ($K_n = B/60 \times 1000 \times J_n$) [g]

Concentration of IPA in the fluid when the fluid discharged from the pressure container 21 between t=n second and t=n+1 second is depressurized to atmospheric pressure: Ln ($L_n = J_n \times F/G$) [vol %]

The temporal change data of $L_n$ is used as the reference data D0.

The temporal change data of $L_n$ is calculated assuming that all of the IPA is dissolved in $CO_2$ at t=0 second and is in a supercritical state, but may be calculated assuming that at t=0 second, a part of the IPA remains on the substrate W in a liquid state. In the latter case, the reference data creator 96 calculates the temporal change data of $L_n$ in consideration of a drying rate of the IPA.

The temporal change data of $L_n$ shows a change in IPA concentration at the discharge port 28 of the pressure container 21. In addition, a change in IPA concentration in the concentration measurement part 70 is delayed compared to the change in IPA concentration in the discharge port 28 of the pressure container 21. The delay time is equal to a movement time for $CO_2$ and IPA to move from the pressure container 21 to the concentration measurement part 70.

Therefore, the reference data creator 96 may calculate the moving time T of the fluid from the pressure container 21 to the concentration measurement part 70 based on a volume of the discharge line L2, and may correct the reference data D0. The corrected reference data D0 is obtained by delaying the temporal change data of $L_n$ by the calculated moving time T.

$CO_2$ and IPA pass through a first section, a second section, and a third section while moving from the pressure container 21 to the concentration measurement part 70. The first section is a section from the discharge port 28 of the pressure container 21 to the depressurizing valve 53. The second section is a section from the depressurizing valve 53 to an upstream end of the concentration measurement line L3. The third section is a section from the upstream end of the concentration measurement line L3 to the concentration measurement part 70. The second section may be further divided into a plurality of sections at positions of the opening/closing valves 52e, 52f, and 52g. This is because the pressure loss of each of the opening/closing valves 52e, 52f, and 52g causes a difference in pressure between an upstream and a downstream of each of the opening/closing valves 52e, 52f, and 52g.

Physical quantities used to calculate the moving time of $CO_2$ and the like are, for example, as follows. The peak concentration of IPA in the fluid discharged from the pressure container 21 is about 1 vol % to 5 vol %. Therefore, for the sake of simplification of calculation formulas, the moving time T required for only $CO_2$ to move from the pressure container 21 to the concentration measurement part 70 is calculated.

Volume of the first section: $V_1$ [m$^3$]
Pressure in the first section: $P_1$ [MPa]
Temperature in the first section: $T_1$ [degrees C.]
Density of $CO_2$ in the first section: $\rho_1$ [kg/m$^3$]
Mass of $CO_2$ in the first section: $W_1$ ($W_1 = V_1 \times \rho_1$) [kg]
Flow rate of $CO_2$ in the first section: $Q_1$ [kg/min]
Volume of the second section: $V_2$ [m$^3$]
Pressure in the second section: $P_2$ [MPa]
Temperature in the second section: $T_2$ [degrees C.]
Density of $CO_2$ in the second section: $\rho_2$ [kg/m$^3$]
Mass of $CO_2$ in the second section: $W_2$ ($W_2 = V_2 \times \rho_2$) [kg]
Flow rate of $CO_2$ in the second section: $Q_2$ ($Q_2 = Q_1$) [kg/min]
Volume of the third section: $V_3$ [m$^3$]
Flow rate of $CO_2$ in the third section: $Q_3$ [L/min]

$Q_1$ and $Q_2$ are equal to B and are measured by the flow meter 54. In addition, $Q_3$ is measured by the flow meter 72. The moving time T [sec] is obtained from the formula "$T = (W_1 + W_2)/Q_1 \times 60 + V_3/Q_3 \times 60 \times 1000$."

The reference data creator 96 may correct the reference data D0 based on a response time of the concentration measurement part 70 itself. The corrected reference data D0 is obtained by delaying the temporal change data of $L_n$ by the response time of the concentration measurement part 70.

The change in concentration C will be described again with reference to the reference data D0 illustrated in FIG. 4. First, after the start of step S3, the fluid mixture of the supercritical fluid and the drying liquid dissolved in the supercritical fluid is discharged from the pressure container 21 to the discharge line L2. As a result, the concentration C of the drying liquid measured by the concentration measurement part 70 increases and reaches the peak concentration.

In the reference data D0, the peak of the concentration C and a reaching time t1 to reach the peak of the concentration C depend on the amount of the liquid film of the drying liquid formed in advance. As the amount of the liquid film of the drying liquid increases, the amount of the drying liquid dissolved in the supercritical fluid increases, and thus the peak of the concentration C increases. In addition, as the amount of the liquid film of the drying liquid increases, the reaching time t1 increases because it takes more time to dissolve the drying liquid in the supercritical fluid. Therefore, the peak of the concentration C and the reaching time t1 represents the amount of the liquid film of the drying liquid formed in advance.

After the concentration C of the drying liquid reaches the peak concentration, the concentration C decreases as the substitution of the liquid film the drying liquid with the supercritical fluid progresses on the top surface of the substrate W. The decrease in the concentration C represents a degree of progress of substituting the liquid film the drying liquid with the supercritical fluid, and represents the progress of drying the substrate W. As the drying of the substrate W progresses, the amount of the remaining liquid film of the drying liquid decreases, and a rate of decrease in the concentration C is reduced.

The drying termination detector 97 detects termination of drying the substrate W based on the temporal change data D1 stored in the storage 95. The termination of drying the substrate W is termination of substituting the liquid film of the drying liquid on the top surface of the substrate W with the supercritical fluid.

Specifically, as an example, the drying termination detector 97 sets a termination detection time t0 for detecting the termination of drying the substrate W and a termination detection concentration C0 from the reference data D0. The termination detection time t0 is, for example, an elapsed time t at the time when the rate of decrease of the concentration C reaches a threshold value in the reference data D0. In addition, the termination detection concentration C0 is, for example, a concentration C corresponding to the termination detection time t0 in the reference data D0. The termination detection concentration C0 may be a concentration obtained by shifting the concentration C corresponding to the termination detection time to in the reference data D0 by a predetermined amount. The method of setting to and C0 is not particularly limited.

The drying termination detector 97 sets the termination detection time t0 and the termination detection concentration C0 for detecting the termination of drying the substrate W, and then detects the concentration C at the time when the elapsed time t reaches the termination detection time t0 during the drying of the substrate W to compare the detected concentration C with the termination detection concentration C0. The drying termination detector 97 detects the termination of drying the substrate W by detecting that the detected concentration C is C0 or less.

Figure 6:
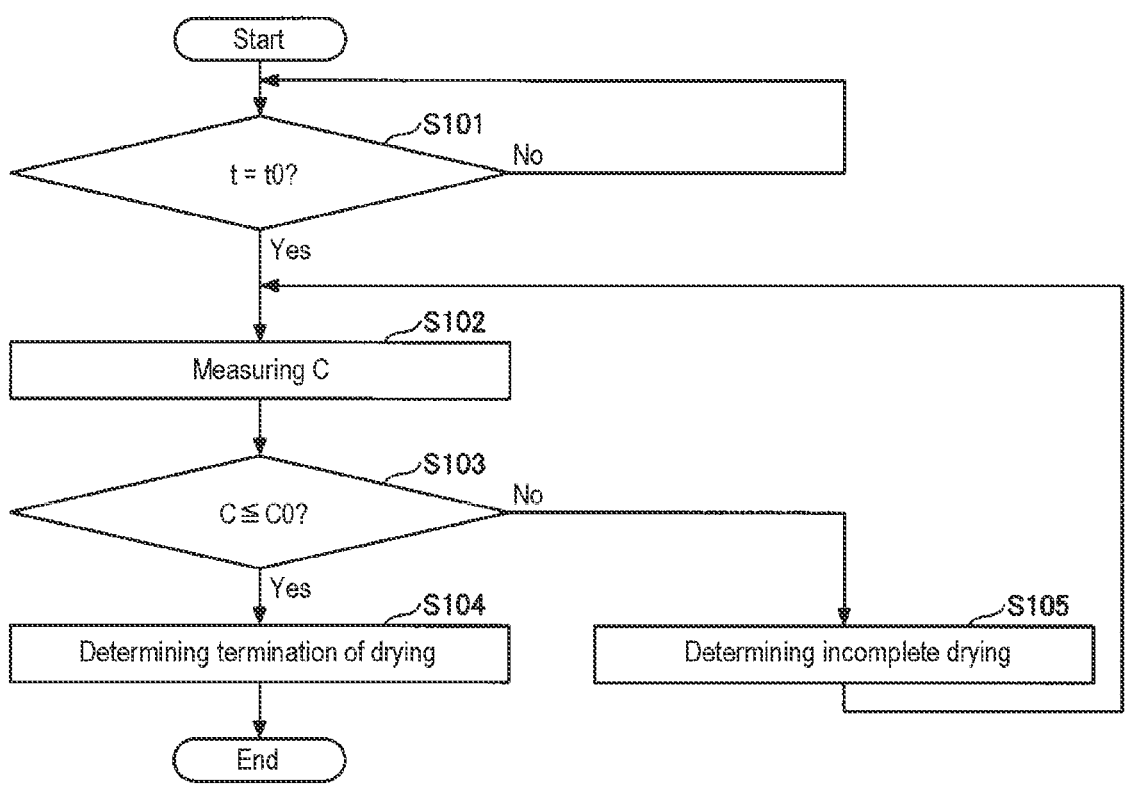
FIG. 6 is a flowchart illustrating an exemplary process performed by a drying termination detection part.

Next, an exemplary process performed by the drying termination detector 97 will be described with reference to FIG. 6. First, in step S101, the drying termination detector 97 checks whether or not the elapsed time t has reached to. When the elapsed time t has not reached to (step S101, "NO"), the drying termination detector 97 repeats the above step S101 after a lapse of a unit time.

On the other hand, when the elapsed time t has reached t0 (step S101, "YES"), the drying termination detector 97 measures the concentration C of the drying liquid by the concentration measurement part 70 (step S102). Subsequently, the drying termination detector 97 determines whether or not the concentration C measured in step S102 is equal to or less than the termination detection concentration C0 (step S103).

When the concentration C is higher than the termination detection concentration C0 (step S103, "NO"), since the concentration of the drying liquid is high, the drying termination detector 97 determines that the drying of the substrate W is incomplete (step S105). Thereafter, the distribution in step S3 is extended, and the drying termination detector 97 repeats the above step S102.

When the concentration C is equal to or lower than the termination detection concentration C0 (step S103, "YES"), since the concentration of the drying liquid is low, the drying termination detector 97 determines that the drying of the substrate W is terminated (step S104). Thereafter, the drying termination detector 97 terminates the current process. Thereafter, the depressurization in step S4 begins.

Since the substrate W is dried inside the pressure container 21, the drying state of the substrate W cannot be observed directly. Therefore, in the related art, the distribution time in step S3 has been set long to a certain extent so as to reliably terminate the drying of the substrate W before the start of depressurization in step S4. Thus, there is a waste in time.

According to the present embodiment, by detecting the termination of drying the substrate W by the drying termination detector 97, it is possible to make the timing to start depressurization in step S4 earlier than in the related art, and thus it is possible to improve throughput.

Starting the depressurization in step S4 may be prohibited until the drying termination detector 97 detects the termination of drying the substrate W. When the start timing of the depressurization in step S4 is erroneously set earlier, it is possible to optimize the start timing.

The drying abnormality detector 98 detects abnormality in drying the substrate W based on the temporal change data D1 stored in the storage 95. The abnormality in drying the substrate W include, for example, abnormality in the amount of the liquid film of the drying liquid. When the amount of liquid film is too large, particles are generated. In addition, when the amount of the liquid film is too small, the concave-convex pattern collapses.

Specifically, for example, the drying abnormality detector 98 detects the time t1 for the concentration C to reach the peak concentration in the reference data D0. In addition, the drying abnormality detector 98 sets a sum of the peak concentration and a fluctuation-allowable width as an upper limit value $C1_{max}$, and sets a difference between the peak concentration and the fluctuation-allowable width as a lower limit value $C1_{min}$.

Thereafter, the drying abnormality detector 98 detects the concentration C at the time when the elapsed time t reaches the reaching time t1 during the drying of the substrate W. and compares the detected concentration C with the peak concentration $C_{max}$ so as to detect abnormality in the amount of the liquid film of the drying liquid. When the detected concentration C exceeds the upper limit value $C1_{max}$, the amount of the liquid film is too large. When the detected concentration C is less than the lower limit value $C1_{min}$, the amount of the liquid film is too small.

In addition, the drying abnormality detector 98 may detect abnormality in a length of a drying time of the substrate W as drying abnormality of the substrate W. The drying time is the elapsed time t at the time when the concentration C reaches the termination detection concentration C0. When the drying time is too long, it may be considered that the amount of the liquid film is too large or a problem has occurred in the substrate processing apparatus 1.

Specifically, as an example, the drying abnormality detector 98 sets an abnormality detection time t2 and an abnormality detection concentration C2 of the substrate W from the reference data D0. The abnormality detection concentration C2 is, for example, the same value as the termination detection concentration C0. In addition, the abnormality detection time t2 is, for example, the same value as the termination detection time to. The method of setting t2 and C2 is not particularly limited.

Thereafter, the drying abnormality detector 98 detects the concentration C at the time when the elapsed time t reaches t2 during the drying of the substrate W. and compares the detected concentration C with C2 to detect abnormality in the length of the drying time. When the detected concentration C exceeds C2, the concentration C is too high even though the elapsed time t has sufficiently passed. Therefore, the length of the drying time is too long.

Figure 7:
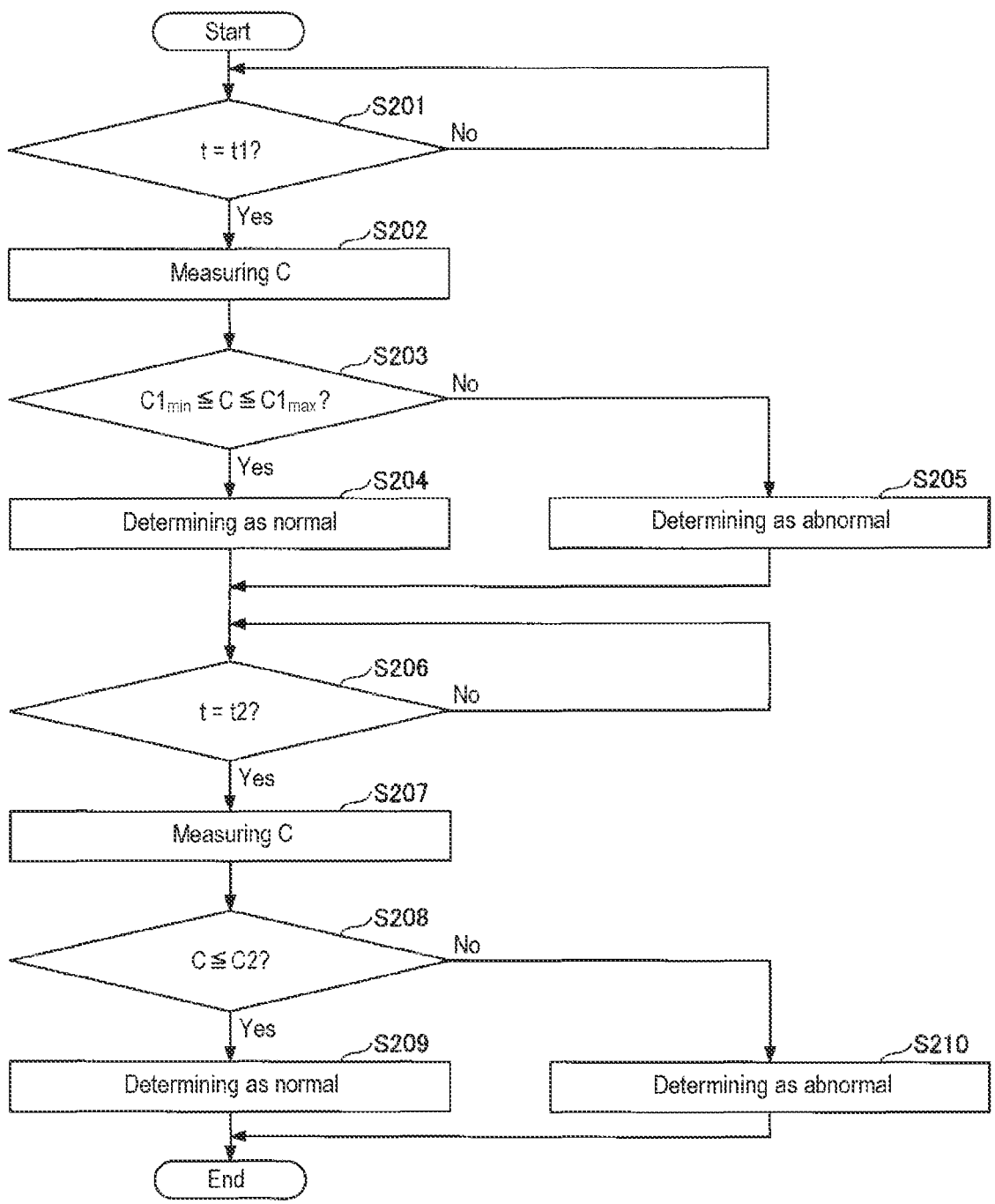
FIG. 7 is a flowchart illustrating an exemplary process performed by a drying abnormality detection part.

Next, an exemplary process performed by the drying abnormality detector 98 will be described with reference to FIG. 7. First, in step S201, the drying abnormality detector 98 checks whether or not the elapsed time t has reached t1. When the elapsed time t has not reached t1 (step S201, "NO"), the drying abnormality detector 98 repeats the above step S201 after a lapse of a unit time.

On the other hand, when the elapsed time t has reached t1 (step S201, "YES"), the drying abnormality detector 98 measures the concentration C of the drying liquid by the concentration measurement part 70 (step S202). Subsequently, the drying abnormality detector 98 determines whether or not the concentration C measured at the time of t=t1 is equal to or higher than the lower limit value $C1_{min}$ and equal to or lower than the upper limit value $C1_{max}$ (step S203).

When the concentration C at the time of t=t1 is equal to or higher than the lower limit value $C1_{min}$ and equal to or lower than the upper limit value $C1_{max}$ (step S203, "YES"), the drying abnormality detector 98 determines that the amount of the liquid film is normal (step S204). Thereafter, the drying abnormality detector 98 performs step S206.

On the other hand, when the concentration C at the time of t=t1 is lower than the lower limit value $C1_{min}$ or exceeds the upper limit value $C1_{max}$ (step S203, "NO"), the drying abnormality detector 98 determines that the amount of the liquid film is abnormal (step S205). Thereafter, the drying abnormality detector 98 performs step S206.

In step S206, the drying abnormality detector 98 checks whether or not the elapsed time t has reached 2. When the elapsed time t has not reached t2 (step S206, "NO"), the drying abnormality detector 98 repeats the above step S206 after a lapse of a unit time.

On the other hand, when the elapsed time t has reached t2 (step S206, "YES"), the drying abnormality detector 98 measures the concentration C of the drying liquid by the concentration measurement part 70 (step S207). Subsequently, the drying abnormality detector 98 determines whether or not the concentration C measured at the time of t=t2 is equal to or lower than the abnormality detection concentration C2 (step S208).

When the concentration C at the time of t=t2 is equal to or lower than the abnormality detection concentration C2 (step S208, "YES"), the drying abnormality detector 98 determines that the length of the drying time is normal (step S209). Thereafter, the drying abnormality detector 98 terminates the current process.

On the other hand, when the concentration C at the time of t=t2 excesses the abnormality detection concentration C2 (step S208, "NO"), the drying abnormality detector 98 determines that the length of the drying time is abnormal (step S210). Thereafter, the drying abnormality detector 98 terminates the current process.

When the drying time is too long, it may be considered that the amount of the liquid film is too large or a problem has occurred in the substrate processing apparatus 1. Which problem has occurred may be determined by using the result of the check in step S203.

That is, when it is determined that the amount of the liquid film is normal as a result of the check in step S203, and it is determined that the length of the drying time is abnormal as a result of the check in step S208, it may be considered that a problem has occurred in the substrate processing apparatus 1.

The substrate W for which drying abnormality has been detected by the drying abnormality detector 98 is treated as a defective product, and the subsequent process is stopped. It is possible to prevent an unnecessary process from being performed on defective products.

In step S2 of FIG. 3, the supply line L1 supplies the supercritical fluid into the pressure container 21 to increase the internal pressure of the pressure container 21. At that time, among the opening/closing valves 52c to 52g of the discharge line L2, at least the opening/closing valve 52c closes the flow path of the discharge line L2 such that the fluid inside the pressure container 21 does not leak.

The leakage detector 99 measures the concentration C by the concentration measurement part 70 provided on a downstream side of the opening/closing valve 52c in a state in which the opening/closing valve 52c of the discharge line L2 is closed, and detects leakage of the opening/closing valve 52c from the measured concentration C. For example, when the concentration C exceeds a threshold value, it is determined that there is leakage.

While boosting the internal pressure of the pressure container 21, the opening/closing valve 52c closes the flow path of the discharge line L2, and the remaining opening/closing valves 52e to 52g may close or open the flow path of the discharge line L2. When the concentration measurement part 70 is provided on a downstream side of the opening/closing valves 52e to 52g, it is also possible to detect leakage of the opening/closing valves 52e to 52g.

Figure 8:
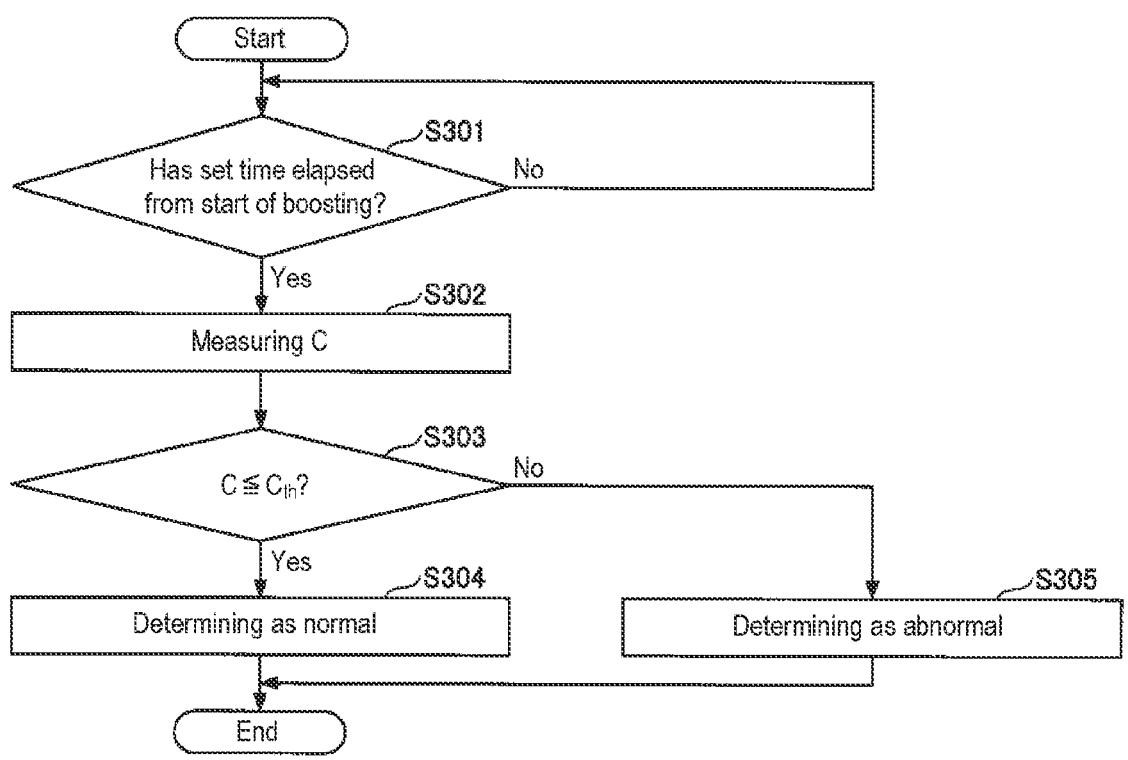
FIG. 8 is a flowchart illustrating an exemplary process performed by a leakage detection part.

Next, an exemplary process performed by the leakage detector 99 will be described with reference to FIG. 8. First, in step S301, the leakage detector 99 checks whether or not a set time has elapsed from a start of boosting. When the set time has elapsed from the start of boosting, the internal pressure of the pressure container 21 becomes sufficiently higher than atmospheric pressure, which makes it possible to check leakage based on a difference in pressure therebetween. When the set time has not elapsed from the start of boosting (step S301, "NO"), the leakage detector 99 repeats the above step S301 after a lapse of a unit time.

On the other hand, when the set time has elapsed from the start of boosting (step S301, "YES"), the leakage detector 99 measures the concentration C of the drying liquid by the concentration measurement part 70 (step S302). Subsequently, the leakage detector 99 determines whether or not the concentration C measured in step S302 is equal to or lower than a threshold value $C_{th}$ (step S303). The threshold value $C_{th}$ is set to be larger than a measurement error of the concentration measurement part 70.

When the concentration C is equal to or lower than the threshold value $C_{th}$ (step S303, "YES"), the leakage detector 99 determines that the opening/closing valve 52c is normal and there is no leakage (step S304). Thereafter, the leakage detector 99 terminates the current process.

On the other hand, when the concentration C exceeds the threshold value $C_{th}$ (step S303, "NO"), the leakage detector 99 determines that the opening/closing valve 52c is abnormal and that there is leakage (step S305). Thereafter, the leakage detector 99 terminates the current process.

Although the embodiments of the substrate processing apparatus and the substrate processing method according to the present disclosure have been described above, the present disclosure is not limited to the above-described embodiments. Various changes, modifications, substitutions, additions, deletions, and combinations can be made within the scope of the claims. Of course, these also fall within the technical scope of the present disclosure.

According to the present disclosure, it is possible to simplify a structure of a concentration measurement part configured to measure a concentration of a drying liquid in a fluid flowing through a discharge line.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A substrate processing apparatus for drying a substrate by substituting a liquid film of a drying liquid formed on the substrate with a supercritical fluid, the substrate processing apparatus comprising:

a pressure container configured to accommodate the substrate on which the liquid film is formed;

a discharge line configured to discharge a fluid inside the pressure container;

a depressurizing valve provided in a middle of the discharge line;

a concentration measurement part configured to measure a concentration of the drying liquid in the fluid flowing through the discharge line;

a storage configured to store temporal change data of the concentration of the drying liquid measured every unit time by the concentration measurement part; and a drying termination detector configured to detect termination of drying the substrate based on the temporal change data stored in the storage, wherein the concentration measurement part is provided on a downstream side of the depressurizing valve of the discharge line and measures the concentration of the drying liquid in the fluid depressurized by the depressurizing valve.

2. The substrate processing apparatus of claim 1, wherein the storage stores reference data of the temporal change data in advance, wherein the reference data is data in which an elapsed time from starting a fluid discharge by the discharge line and the concentration of the drying liquid measured by the concentration measurement part are associated with each other, and wherein the drying termination detector sets a termination detection time and a termination detection concentration for detecting the termination of drying the substrate from the reference data, detects the concentration of the drying liquid when the elapsed time has reached the termination detection time during the drying of the substrate, and detects the termination of drying the substrate by detecting that the detected concentration of the drying liquid is equal to or lower than the termination detection concentration.

3. The substrate processing apparatus of claim 2, further comprising a drying abnormality detector configured to detect abnormality of drying the substrate based on the temporal change data stored in the storage.

4. The substrate processing apparatus of claim 3, wherein the drying abnormality detector detects a reaching time when the concentration of the drying liquid reaches a peak concentration in the reference data, detects the concentration of the drying liquid at a time when the elapsed time reaches the reaching time during the drying of the substrate, and detects abnormality in an amount of the liquid film by comparing the detected concentration of the drying liquid with the peak concentration.

5. The substrate processing apparatus of claim 4, wherein the drying abnormality detector sets an abnormality detection time and an abnormality detection concentration for the substrate from the reference data, detects the concentration of the drying liquid at a time when the elapsed time reaches the abnormality detection time during the drying of the substrate, and detects abnormality in a drying time by comparing the detected concentration of the drying liquid with the abnormality detection concentration.

6. The substrate processing apparatus of claim 5, further comprising a reference data creator configured to create the reference data based on the amount of the liquid film of the drying liquid formed on a top surface of the substrate in advance, a volume of the pressure container, an internal pressure of the pressure container, and a discharge flow rate of the fluid from the pressure container.

7. The substrate processing apparatus of claim 6, wherein the reference data creator corrects the reference data by calculating a moving time of the fluid from the pressure container to the concentration measurement part based on a volume of the discharge line.

8. The substrate processing apparatus of claim 7, further comprising:

an opening/closing valve provided in a middle of the discharge line; and a leakage detector configured to measure the concentration of the drying liquid by the concentration measurement part provided on a downstream side of the opening/closing valve in a state in which the opening/closing valve closes a flow path of the discharge line, and configured to detect leakage of the opening/closing valve from the measured concentration of the drying liquid.

9. The substrate processing apparatus of claim 8, further comprising:

a concentration measurement line branching from the discharge line on the downstream side of the depressurizing valve of the discharge line, the concentration measurement part being provided in a middle of the concentration measurement line; and a heater configured to heat the concentration measurement line.

10. The substrate processing apparatus of claim 2, further comprising a reference data creator configured to create the reference data by averaging a plurality of pieces of previously measured temporal change data.

11. The substrate processing apparatus of claim 2, further comprising a reference data creator configured to create the reference data based on an amount of the liquid film of the drying liquid formed on a top surface of the substrate in advance, a volume of the pressure container, an internal pressure of the pressure container, and a discharge flow rate of the fluid from the pressure container.

12. The substrate processing apparatus of claim 1, further comprising:

an opening/closing valve provided in a middle of the discharge line; and a leakage detector configured to measure the concentration of the drying liquid by the concentration measurement part provided on a downstream side of the opening/closing valve in a state in which the opening/closing valve closes a flow path of the discharge line, and configured to detect leakage of the opening/closing valve from the measured concentration of the drying liquid.

13. The substrate processing apparatus of claim 1, further comprising:

a concentration measurement line branching from the discharge line on the downstream side of the depressurizing valve of the discharge line, the concentration measurement part being provided in a middle of the concentration measurement line; and a heater configured to heat the concentration measurement line.

14. A substrate processing apparatus for drying a substrate by substituting a liquid film of a drying liquid formed on the substrate with a supercritical fluid, the substrate processing apparatus comprising:

a pressure container configured to accommodate the substrate on which the liquid film is formed;

a discharge line configured to discharge a fluid inside the pressure container:

a depressurizing valve provided in a middle of the discharge line;

a concentration measurement part configured to measure a concentration of the drying liquid in the fluid flowing through the discharge line, a storage configured to store temporal change data of the concentration of the drying liquid measured every unit time by the concentration measurement part; and a drying abnormality detector configured to detect abnormality of drying the substrate based on the temporal change data stored in the storage, wherein the concentration measurement part is provided on a downstream side of the depressurizing valve of the discharge line and measures the concentration of the drying liquid in the fluid depressurized by the depressurizing valve.

15. The substrate processing apparatus of claim 14, further comprising:
    an opening/closing valve provided in a middle of the discharge line; and
    a leakage detector configured to measure the concentration of the drying liquid by the concentration measurement part provided on a downstream side of the opening/closing valve in a state in which the opening/closing valve closes a flow path of the discharge line, and configured to detect leakage of the opening/closing valve from the measured concentration of the drying liquid.

16. The substrate processing apparatus of claim 14, further comprising:
    a concentration measurement line branching from the discharge line on the downstream side of the depressurizing valve of the discharge line, the concentration measurement part being provided in a middle of the concentration measurement line; and
    a heater configured to heat the concentration measurement line.

17. A substrate processing method comprising:
    loading a substrate on which a liquid film of a drying liquid is formed into a pressure container;
    drying the substrate by supplying a supercritical fluid into the pressure container and substituting the liquid film with the supercritical fluid;
    discharging a fluid inside the pressure container to a discharge line;
    depressurizing the fluid flowing through the discharge line by a depressurizing valve provided in a middle of the discharge line;
    measuring, by a concentration measurement part, a concentration of the drying liquid in the fluid depressurized by the depressurizing valve;
    storing, in a storage, temporal change data of the concentration of the drying liquid measured every unit time by the concentration measurement part; and
    detecting termination of drying the substrate based on the temporal change data stored in the storage.

18. The substrate processing method of claim 17, further comprising detecting abnormality of drying the substrate based on the temporal change data stored in the storage.

19. The substrate processing method of claim 18, further comprising measuring, in a state in which an opening/closing valve provided in a middle of the discharge line closes a flow path of the discharge line, the concentration of the drying liquid by the concentration measurement part provided on a downstream side of the opening/closing valve, and detecting leakage of the opening/closing valve from the measured concentration of the drying liquid.

20. The substrate processing method of claim 17, further comprising:
    detecting abnormality of drying the substrate based on the temporal change data stored in the storage.

* * * * *